(12) United States Patent
Jindal et al.

(10) Patent No.: US 10,833,881 B1
(45) Date of Patent: Nov. 10, 2020

(54) DISTRIBUTING PUBLICATION MESSAGES TO DEVICES

(71) Applicant: Amazon Technologies, Inc., Seattle, WA (US)

(72) Inventors: Himanshu Jindal, Seattle, WA (US); Gary Wicker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 15/804,799

(22) Filed: Nov. 6, 2017

(51) Int. Cl.
| H04L 12/18 | (2006.01) |
| H04L 29/08 | (2006.01) |
| H04L 12/66 | (2006.01) |
| H04L 29/06 | (2006.01) |

(52) U.S. Cl.
CPC .............. H04L 12/18 (2013.01); H04L 12/66 (2013.01); H04L 67/10 (2013.01); *H04L 63/0876* (2013.01); *H04L 63/10* (2013.01); *H04L 67/306* (2013.01)

(58) Field of Classification Search
CPC .............................................. H04L 63/10–108
See application file for complete search history.

(56) References Cited

U.S. PATENT DOCUMENTS

| 9,146,764 | B1 * | 9/2015 | Wagner | G06F 9/45533 |
| 9,667,681 | B1 * | 5/2017 | Milyakov | H04L 65/4076 |
| 10,397,303 | B1 * | 8/2019 | Kuo | H04L 61/2038 |
| 10,412,190 | B1 * | 9/2019 | Roche | G06F 9/44505 |
| 10,432,535 | B2 * | 10/2019 | Nandy | H04L 43/08 |
| 2001/0047270 | A1 * | 11/2001 | Gusick | G06Q 30/016 705/1.1 |
| 2003/0115336 | A1 * | 6/2003 | Auerbach | G06Q 30/02 709/228 |
| 2003/0120785 | A1 * | 6/2003 | Young | H04L 29/06 709/228 |
| 2003/0135556 | A1 * | 7/2003 | Holdsworth | H04L 29/06 709/206 |
| 2005/0021622 | A1 * | 1/2005 | Cullen | G06Q 30/02 709/204 |
| 2005/0289630 | A1 * | 12/2005 | Andrews | H04N 21/235 725/116 |
| 2006/0155578 | A1 * | 7/2006 | Eisenberger | G06Q 10/10 705/2 |

(Continued)

*Primary Examiner* — David R Lazaro
*Assistant Examiner* — Julian Chang
(74) *Attorney, Agent, or Firm* — Thorpe North & Western, LLP.

(57) ABSTRACT

A technology is described for distributing a publication message. An example method may include receiving a message at a first device gateway to broadcast to devices subscribed to a broadcast topic. The first device gateway maintains a first subscription table indicating which devices connected to the first device gateway are subscribed to the broadcast topic. The first device gateway distributes the message to the devices indicated in the first subscription table as being subscribed to the broadcast topic. In addition, the first device gateway may distribute the message to a second device gateway which maintains a second subscription table indicating which devices connected to the second device gateway are subscribed to the broadcast topic, and the second device gateway distributes the message to the devices indicated in the second subscription table as being subscribed to the broadcast topic.

20 Claims, 10 Drawing Sheets

(56) References Cited

U.S. PATENT DOCUMENTS

| | | | | |
|---|---|---|---|---|
| 2006/0155581 | A1* | 7/2006 | Eisenberger | G06Q 50/24 |
| | | | | 705/3 |
| 2006/0168043 | A1* | 7/2006 | Eisenberger | G06F 19/326 |
| | | | | 709/206 |
| 2006/0178910 | A1* | 8/2006 | Eisenberger | G06Q 10/00 |
| | | | | 705/3 |
| 2008/0103854 | A1* | 5/2008 | Adam | G06F 21/6218 |
| | | | | 705/344 |
| 2009/0037964 | A1* | 2/2009 | Murray | G06F 16/40 |
| | | | | 725/92 |
| 2009/0177753 | A1* | 7/2009 | Banks | G06Q 10/10 |
| | | | | 709/206 |
| 2010/0256994 | A1* | 10/2010 | Eisenberger | G06Q 10/10 |
| | | | | 705/3 |
| 2011/0125921 | A1* | 5/2011 | Karenos | H04L 45/00 |
| | | | | 709/240 |
| 2011/0134934 | A1* | 6/2011 | Arroyo | H04L 47/2425 |
| | | | | 370/431 |
| 2013/0097236 | A1* | 4/2013 | Khorashadi | G06F 16/951 |
| | | | | 709/204 |
| 2016/0241474 | A1* | 8/2016 | Wang | H04L 45/7453 |
| 2016/0248871 | A1* | 8/2016 | Seed | H04L 67/2809 |
| 2017/0344921 | A1* | 11/2017 | Leonelli | G06Q 10/06311 |
| 2018/0096412 | A1* | 4/2018 | Scott-Nash | G06Q 30/0635 |
| 2018/0115616 | A1* | 4/2018 | Srinivasan | H04L 67/141 |
| 2018/0167476 | A1* | 6/2018 | Hoffner | H04L 67/26 |
| 2018/0183862 | A1* | 6/2018 | Huh | H04L 12/185 |
| 2018/0248804 | A1* | 8/2018 | Nandy | H04L 47/20 |
| 2018/0270310 | A1* | 9/2018 | Venkatesan | H04L 67/12 |
| 2019/0028414 | A1* | 1/2019 | Walker | H04L 67/26 |
| 2019/0068528 | A1* | 2/2019 | Zhang | H04W 12/00502 |
| 2019/0095510 | A1* | 3/2019 | Cruise | G06Q 10/10 |
| 2019/0132347 | A1* | 5/2019 | Wakid | H04L 9/0819 |
| 2019/0230175 | A1* | 7/2019 | Wang, IV | H04L 67/12 |

* cited by examiner

DISTRIBUTING PUBLICATION MESSAGES TO DEVICES

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of a building's heating, cooling, and ventilation systems. Even home appliances offer the possibility of being configured with communication capabilities for the purpose of transmitting status and receiving external control communications.

DETAILED DESCRIPTION

Figure 1A:
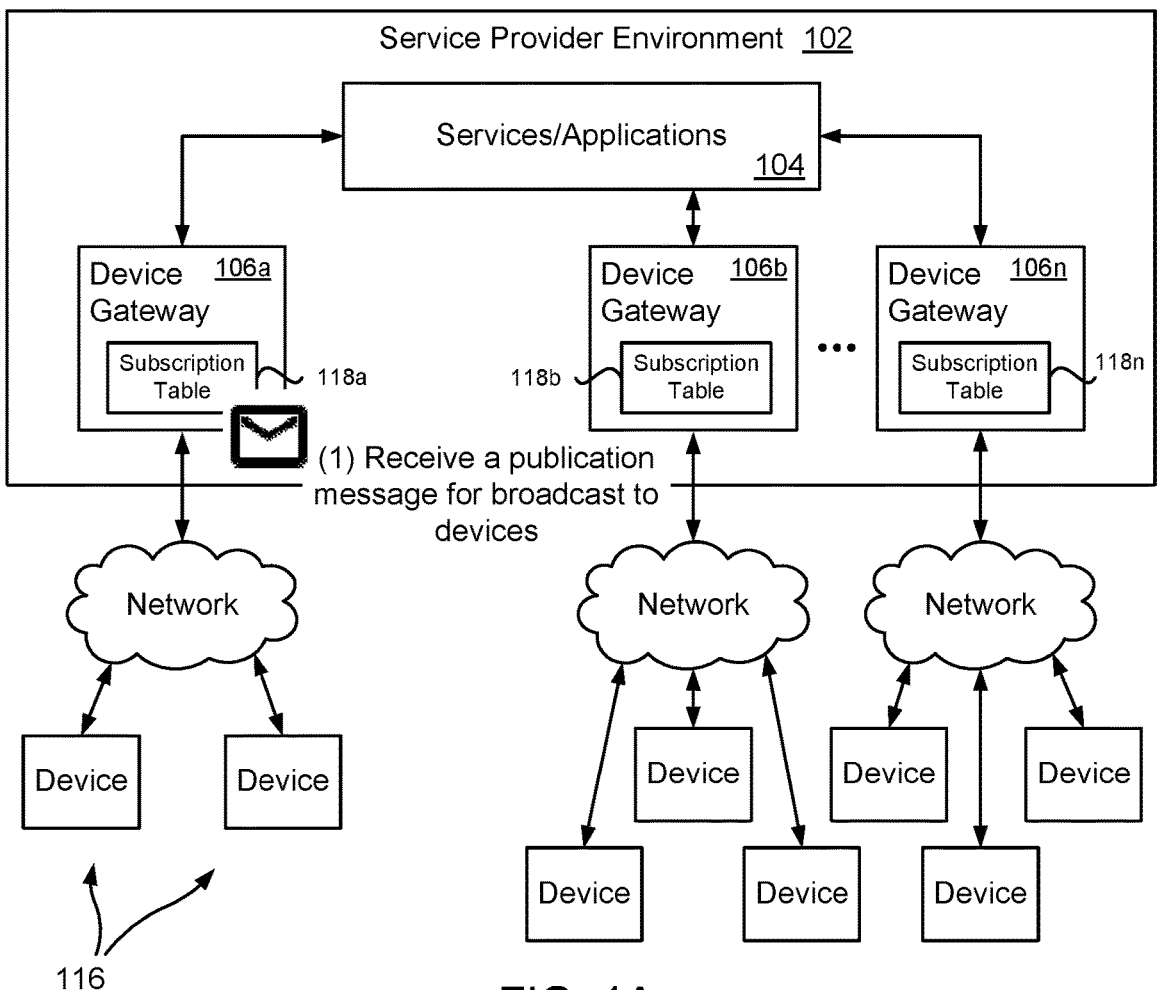
FIG. 1A-C are block diagrams illustrating an example system for distributing messages published to a broadcast topic to devices in network connection with device gateways.

A technology is described for broadcasting messages to devices which are in networked connection with device gateways configured to manage device subscriptions to broadcast topics. A broadcast topic may be used to broadcast publication messages to devices registered with the devices gateways. For example, a customer of a service provider may create a broadcast topic and subscribe the customer's devices registered with a service provider environment to the broadcast topic. The customer's devices may publish publication messages to the broadcast topic and devices subscribed to the broadcast topic may receive the publication message.

In one example of the technology, a device gateway may be configured to manage a local subscription table indicating which of the devices connected to the device gateway are subscribed to receive messages published to a broadcast topic (e.g., a named broadcast channel). The device gateway may manage the subscription table by adding and removing devices subscribed to the broadcast topic, and devices may subscribe to a broadcast topic by sending a subscription request to a device gateway. A subscription request may be included in a connection request (i.e., a request to establish a network connection with a device gateway) or a subscription request may be a separate request. The device gateway may add the device to a subscription table stored in computer memory allocated to the device gateway. More specifically, a device identifier for the device may be added to the subscription table linking the device identifier to a device registration and the broadcast topic.

A message published to a broadcast topic may be received at a device gateway. For example, a device connected to the device gateway via a network may send a publication message for the broadcast topic to the device gateway. The device gateway may then identify the publication message for the broadcast topic and distribute the publication message to other device gateways included in a computing service environment. The device gateways (including the device gateway that received the publication message) may then send the publication message to devices connected to the device gateways. For example, each device gateway may use a separate locally managed subscription table to identify which devices connected to the device gateway are subscribed to the broadcast topic and then distribute the publication message to the devices subscribed to the broadcast topic.

In the past, broadcast subscriptions have been managed and stored in a central subscription data store of a publication-submission message service. Distributing a publication message for broadcasting to subscribed devices included querying the central subscription data store to obtain broadcast subscription information and distributing the publication message to the subscribed entities. Storing broadcast subscription information in a central subscription data store may result in making multiple requests to the central subscription data store which increases network costs (e.g., a number of requests and amount of data transmitted over a network). In addition, there may be latency associated with distributing a publication message to subscribed devices when the publication message is sent from the centralized publication-submission service. For example, broadcasting a publication message from a centralized publication-submission service may take several minutes to complete broadcast of the publication message that reaches millions, tens of millions, hundreds of millions, or even more devices. This rate of broadcast may be too slow for high priority messages which need to be received quickly (e.g., in fractions or a second or in a few seconds). The present technology decreases network costs and latency associated with broadcasting a publication message to devices by managing broadcast subscription information in a subscription table stored in local computer memory of a device gateway. Storing a subscription table on a device gateway provides the device gateway direct access to the subscription table, thereby avoiding network costs and latency associated with obtaining broadcast subscription information from a central subscription data store.

Figure 1B:
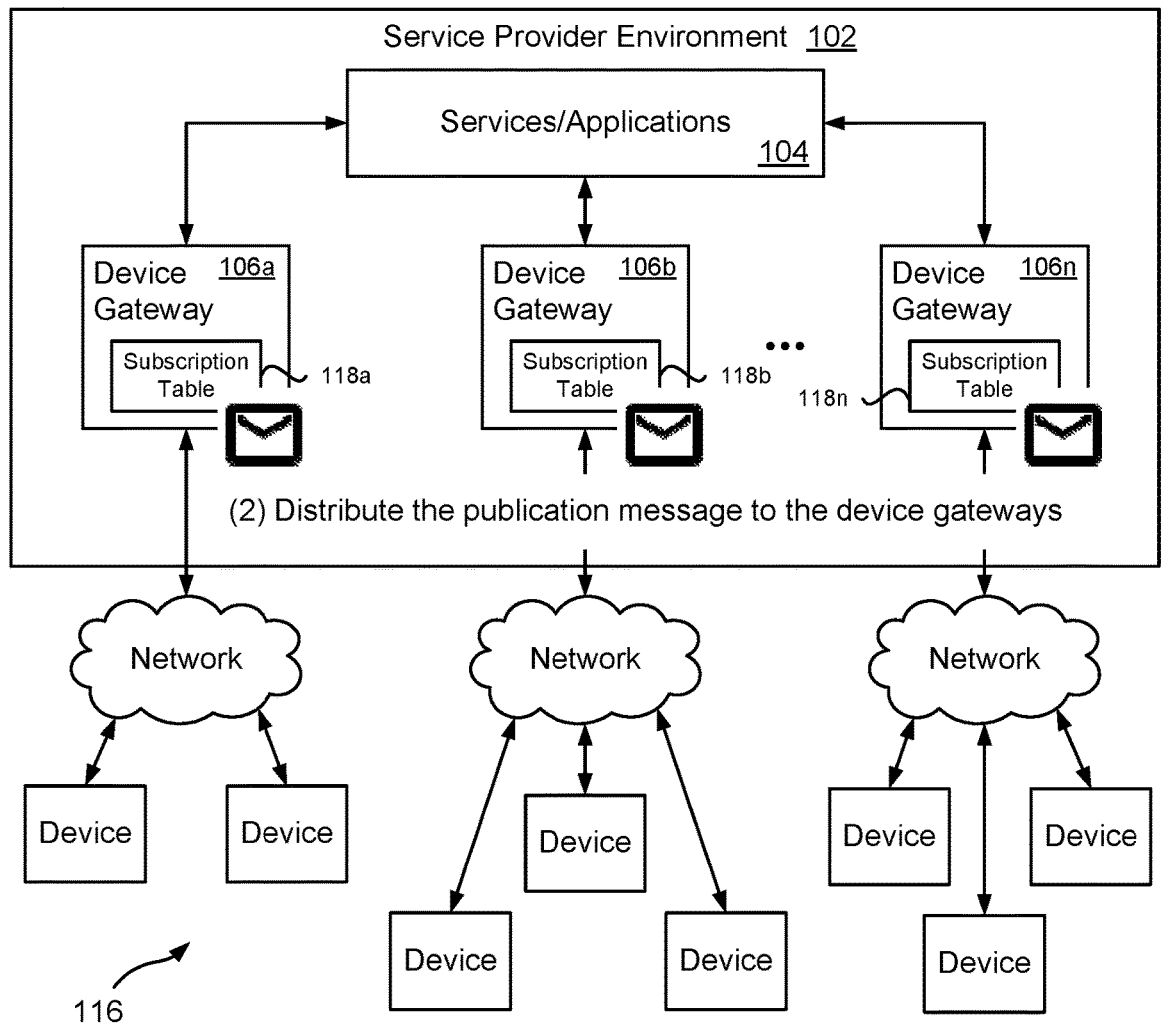
Figure 1C:
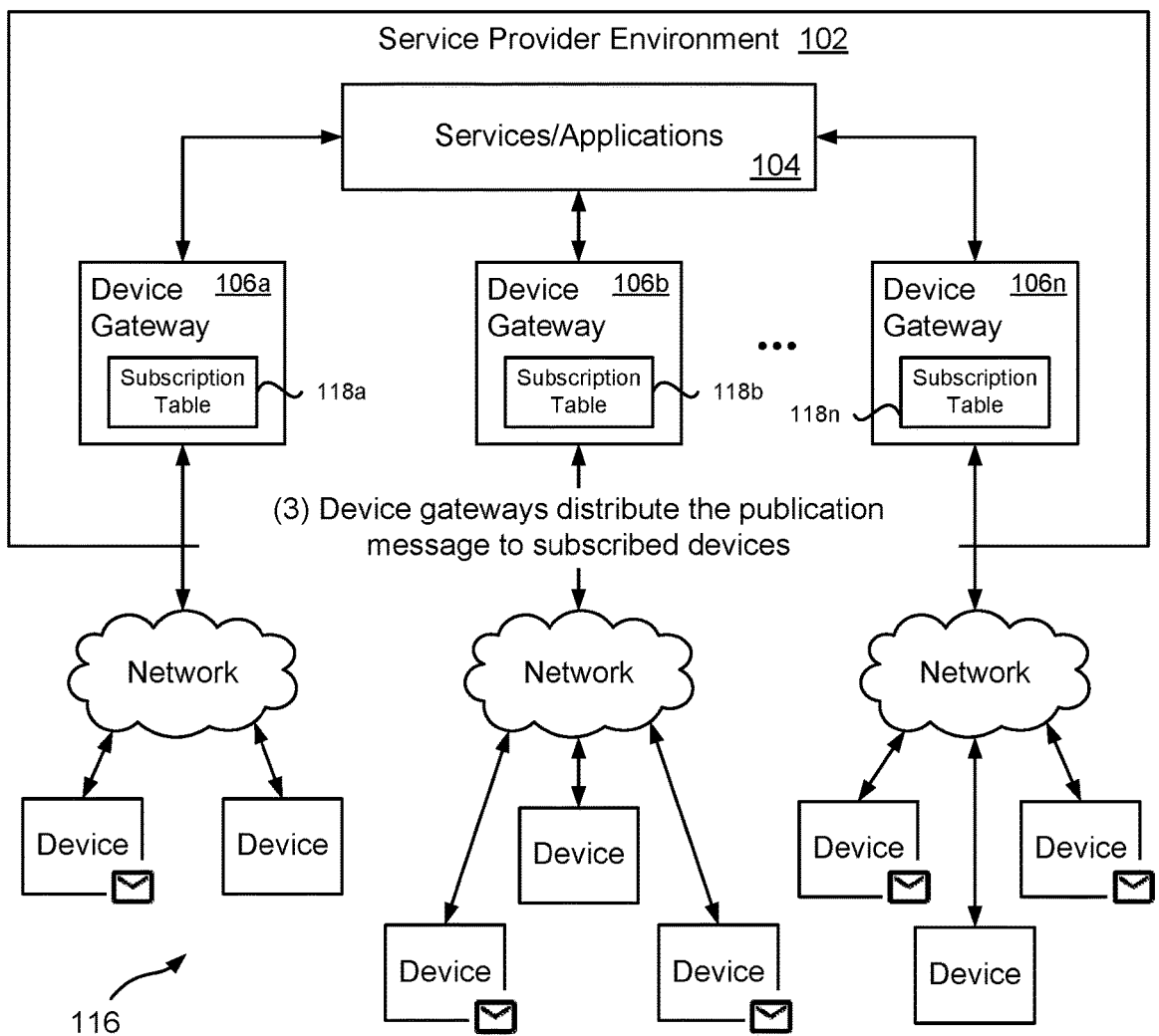

To further describe the present technology, examples are now provided with reference to the figures. FIGS. 1A-C are block diagrams illustrating a high level example of a system 100 and method for broadcasting a publication message to devices 116 that have a network connection with device gateway 106a-n. A device 116 may be one of many devices 116 that create a large network of addressable devices. This entire "network" is commonly referred to as the Internet of Things (IoT). The devices 116 may be network addressable and/or eventually addressable (e.g., capable of receiving relayed messages). A device gateway 106a-n may provide an interface between devices 116 and managed services and applications 104 hosted in a service provider environment 102 (e.g., a computing services environment), allowing the devices 116 to interact with the managed services and applications 104 by way of publication messages and data sent through the device gateway 106a-n. The device gateway 106a-n may also create and manage the connection between the device and the service provider environment 102. A publication/subscription messaging service may be used to exchange publication messages between the devices 116, and the managed services and applications 104 in the service provider environment 102. Illustratively, publication/subscription messaging allows publication messages to be sent to clients (or other computing services or systems) which subscribe to a publication topic. A message topic (e.g., a named logical channel) provides a mechanism to send and receive publication messages. For example, to send a publication message, a component (e.g., a device 116, service, or application 104) called a publisher may send a publication message to the message topic, and the message topic may be used to push the publication message out to multiple subscribers (e.g., a device 116, service, or application 104).

A device gateway 106a-n may be configured to create, manage and maintain connections for devices 116 connected to a service provider environment 102 via a network. For example, a device 116 may send a connection request to the service provider environment 102 and the connection request may be distributed (e.g., via load balancing) to a device gateway 106a-n. The device gateway 106a-n may authenticate the device 116 using device credentials provided by the device 116 and register the device 116 with the service provider environment 102 via the device gateway 106a-n. Thereafter, publication messages sent by the device 116 may be routed through the device gateway 106a-n.

In one example, a connection request received from a device 116 may include a request to subscribe to a broadcast topic (e.g., broadcast topic). A broadcast topic may be used to distribute a publication message to devices 116 subscribed to the broadcast topic. For example, a device 116, service, or application 104 may publish a publication message to a broadcast topic and the publication message may be distributed to devices 116 subscribed to the broadcast topic. In response to receiving a request from a device 116 to subscribe to a broadcast topic, a device gateway 106a-n may add the device 116 (e.g., a device identifier) to a subscription table 118a-n managed by the device gateway 106a-n. As illustrated, the device gateways 106a-n hosted in the service provider environment 102 may manage individual subscription tables 118a-n. The subscription tables 118a-n may be stored in computer memory of the device gateways 106a-n, and the subscription tables 118a-n may indicate which devices 116 connected to the device gateways 106a-n are subscribed to a broadcast topic. For example, a subscription table 118a-n may link a device identifier for a device 116 to a device registration and a broadcast topic. A device registration may be used to associate devices 116 with a customer of a service provider. A subscription table 118a-n managed by a device gateway 106a-n may be used to distribute a publication message to devices 116 connected to the device gateway 106a-n, as described below.

As shown in FIG. 1A, a device gateway 106a may receive a publication message for broadcasting to devices 116 subscribed to a broadcast topic. The publication message may be received from a device 116 connected via a network to the device gateway 106a. As an illustration, a security device (e.g., a security camera, a motion detector, or the like) connected via a network to a device gateway 106a may be configured to detect a security event and publish a publication message to a security alert topic for broadcast to other security devices subscribed to the security alert topic. The publication message may be sent to the device gateway 106a and the publication message may be distributed to subscribed devices as explained later. Alternatively, a publication message may be received from a managed service or application 104 hosted in the service provider environment 102. A service or application 104 may publish the publication message to a broadcast topic and the publication message may be sent to each device gateway 106a-n included in the service provider environment 102, or to device gateways 106a-n subscribed to the broadcast topic, and the device gateways 106a-n may distribute the publication message to subscribed devices as explained later. As an illustration, a customer of a service provider environment 102 may use a service or application 104 to publish a publication message to the customer's security devices subscribed to a security alert topic instructing the security devices to enact a security protocol. The publication message may be sent to the device gateways 106a-n hosted in the service provider environment 102 and the device gateways 106a-n may distribute the publication message to subscribed devices.

The publication message received at the device gateway 106a may specify (e.g., in a message header) a message topic (e.g., a named logical channel) to which the publication message was published and a device registration associated with the publication message. Message topics may include broadcast topics and non-broadcast topics. For example, a broadcast topic (e.g., a named broadcast channel) may be used to distribute a publication message to a very large number of devices 116 (e.g., thousands or millions of devices), whereas a non-broadcast topic may be used to send publication messages to a few devices 116 services, applications 104 or other devices 116.

In response to receiving a publication message from the device 116, the device gateway 106a may be configured to determine whether the publication message is for broadcast to devices 116. For example, the device gateway 106a may be configured to analyze the publication message to determine whether a message topic to which the publication message was published is a broadcast topic. As an illustration, a listing of broadcast topics may be managed in local computer memory (e.g., in a subscription table 118a) and the device gateway 106a may reference the listing to determine whether a message topic specified in the publication message matches a broadcast topic in the listing. In the case that a determination is made that the publication message is published to a broadcast topic, the device gateway 106a may initiate sending of the publication message to many devices subscribed to the broadcast topic.

As shown in FIG. 1B, the device gateway 106a that received the publication message may cause the publication message to be distributed to other device gateways 106b-n hosted in the service provider environment 102. In one example, as described later in association with FIG. 2, the publication message may be sent to a message queue service (shown in FIG. 2) that distributes the publication message to the other device gateways 106b-n hosted in the service provider environment 102. In another example, also described later in association with FIG. 2, a serverless computing service (shown in FIG. 2) may launch compute service program code on a computing resource in the service provider environment 102 and the compute service program code may be configured to distribute the publication message to the other device gateways 106b-n. The publication message may be distributed by the device gateway 106a that received the publication message to other device gateways 106b-n using any type of distribution method, which can include a message topic used by device gateways 106a-n to send publication messages between the device gateways 106a-n. Some examples of distribution methods may include distribution via a centralized message queue, a gossip messaging method, a fan out method, etc. In one example, the device gateway 106a distributing the publication message to the other device gateways 106b-n may add distribution information to the publication message (e.g., via information added to the header of the publication message) that may be used by other device gateways 106b-n to distribute the publication message to devices 116 connected to the device gateways 106b-n. In particular, the distribution information may inform a device gateway 106b-n that the publication message was received at a first device gateway 106a and distributed to other device gateways 106b-n in the service provider environment 102, thereby stopping the other device gateways 106b-n from redistributing the publication message back to any originating device gateways 106a-n.

After receiving the publication message, a device gateway 106a-n may be configured to analyze the publication message to identify a broadcast topic to which the publication message was published and a device registration associated with the publication message. The device gateway 106a-n may reference a subscription table 118a-n managed by the device gateway 106a-n to obtain a device listing indicating which of the devices 116 connected to the device gateway 106a-n may be associated with the device registration and may be subscribed to receive messages published to the broadcast topic. For example, as described earlier, the subscription table 118a-n may include device identifiers linked to a device registration and a broadcast topic. The subscription table 118a-n may be queried for device identifiers linked to the device registration and the broadcast topic.

As shown in FIG. 1C, the device gateways 106a-n may distribute the publication message to the devices 116 subscribed to the broadcast topic as indicated in the subscription tables 118a-n. For example, a device gateway 106a-n may cause the publication message to be replicated and sent (e.g., via a push method) to devices 116 associated with device identifiers obtained from a subscription table 118a-n managed by the device gateway 106a-n.

In one example, a device gateway 106a-n may be configured to determine an amount of network bandwidth to use to send the publication message to the devices 116. The amount of network bandwidth used to send the publication message may be balanced with an amount of network bandwidth used for ongoing communications between the device gateway 106a-n and the devices 116. For example, the determination may be made based on a priority of a publication message for broadcast to devices 116. A higher priority may result in assigning a greater amount of network bandwidth to sending the publication message to the devices 116, whereas a lower priority may result in reserving network bandwidth for other device communications.

Also, in one example, a device gateway 106a-n may be configured to determine a portion of threads included in a thread pool for the device gateway 106a-n that may be used to send a publication message for broadcast to the devices 116. For example, a device gateway 106-a-n may have a certain number of threads that can be used for sending publication messages to devices 116. The device gateway 106a-n may determine a number of threads that can be used to send a publication message without detrimentally affecting the other messaging operations of the device gateway 106a-n. In one example, the determination of a number of threads to use may be based on a priority assigned to a publication message for broadcast to devices 116, such that the priority of the publication message determines the number of threads or percentage of threads that can be used to send the publication message to the devices 116.

Figure 2:
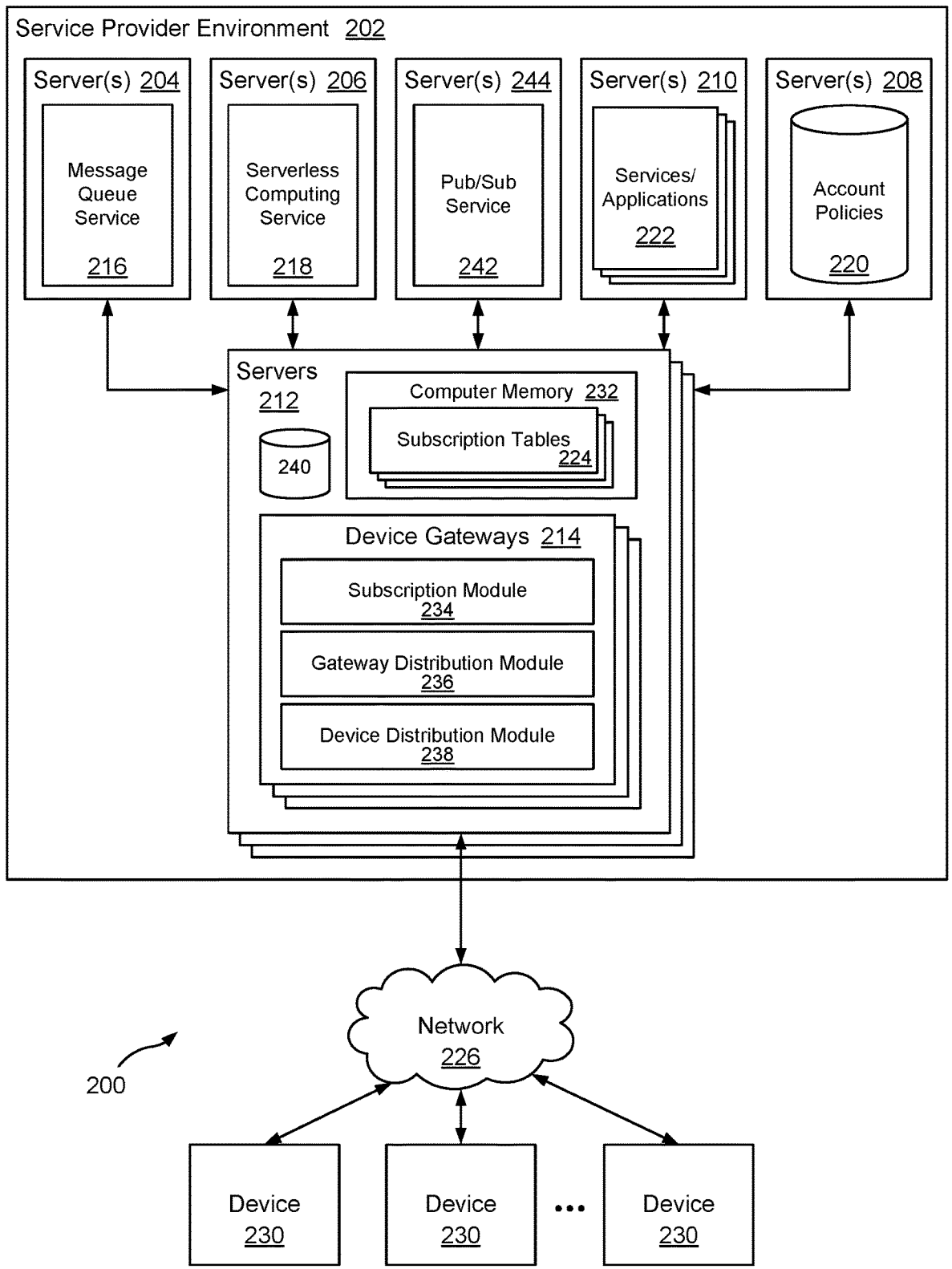
FIG. 2 is a block diagram that illustrates various example components included in a system for distributing messages to devices subscribed to a broadcast topic.

FIG. 2 illustrates components of an example system 200 on which the present technology may be executed. The system 200 may include a plurality of devices 230 in communication via one or more networks 226 with device gateways 212 hosted in a service provider environment 202. Illustratively, the devices 230 may include, but are not limited to, a network of physical devices, automation devices, sensor devices, factory machines, appliances, vehicles, or other objects embedded with electronics, software, sensors, actuators, which are network addressable and/or eventually addressable, allowing devices 230 to collect and exchange data with services and/or applications hosted in the service provider environment. As a non-limiting example, the devices 230 can include network connected: global positioning devices, temperature sensors, water sensors, light switches, light bulbs, power outlets, watches, media players, voice command devices, video cameras, security systems, door locks, smoke alarms, thermostats, weather sensors, vehicles, handheld devices, as well as any other device configured to communicate over a network.

The service provider environment 202 may include servers that host various components of the system 200. A server 212 may host one or more device gateways 214 configured to act as a "gateway" to managed services and/or applications 222 provided to customers of a service provider. The services and applications 222 may be hosted on servers 210 in the service provider environment 202. Illustratively, the services and applications 222 may include: data store services, machine learning services, data streaming services, data analysis services, and other service and applications which customers of the service provider may use to collect, process, analyze, and act on data generated by the customers' devices 230.

A device gateway 214 may be configured to manage connections for devices 230 connected to the device gateway 214 and communicate with the devices 203a-n by transmitting publication messages received from a pub/sub service 242 between the devices 230, the device gateway 214, and the managed services and applications 216, 218, 222 in the service provider environment 202 using a publication/subscription message model. The pub/sub service 242 may use message topics to route publication messages from publishing clients (e.g., devices 230, services and applications 222) to subscribing clients. The publication/subscription message model used by the pub/sub service 242 may include the use of broadcast topics to route publication messages to subscribing clients. In particular, a broadcast topic may be used to route a publication message to devices 230 in network connection to device gateways 214. Publication messages published to a message topic may be handled by the pub/sub service 242, whereas publication messages published to a broadcast topic may be intercepted by a device gateway 214 and distributed to other device gateways 214 and the devices 230 connected to the device gateways 214.

In the example illustrated, a device gateway 214 may include a subscription module 234 used to manage a subscription table 224 stored in computer memory 232 (e.g., volatile memory, non-volatile memory, etc.) of a server 212 hosting the device gateway 214. The subscription table 224 may contain device subscriptions to broadcast topics. In one example, a subscription table 224 may include a broadcast topic field, a device account field, and a device identifier field. A key-value data structure may be used to implement the subscription table 224. The subscription table 224 may link a broadcast topic to a device registration and the device identifiers for devices 230 associated with the device registration. A subscription table 224 managed by a device gateway 214 may be stored in computer memory 232 of a server 212 that hosts the device gateway 214, resulting in a faster access time of subscription information stored in the subscription table 224 as compared to retrieving the subscription information from a non-local storage (e.g., a data store service). In one example, in the event that a size of a subscription table 224 exceeds a memory limitation of a server's 212 computer memory 232, a portion of the subscription table 224 may be stored to the server's local data store 240 (e.g., a mass data storage device or a virtualized mass storage device).

The subscription module 234 may be configured to manage the subscription table 224 by adding/removing subscriptions to broadcast topics to/from the subscription table 224. The subscription module 234 may be configured to subscribe a device to a broadcast topic by adding a device identifier for the device to a subscription table 224 and linking the device identifier to a device registration and the broadcast topic. As an illustration, a device gateway 214 may receive a request from a device 230 to establish a network connection with the device gateway 214. The request to establish network connection may include one or more requests to subscribe to message topics (e.g., various topics which may include broadcast topics). The subscription module 234 may be configured to analyze subscription requests received from devices 230a-b to determine whether a subscription request is for a broadcast topic (as opposed to a non-broadcast topic) and subscribe a device 230 associated with the request to the broadcast topic. For example, the subscription module 234 may be configured to recognize a defined name, a defined namespace, or a prefix for a broadcast topic in a subscription request and subscribe the device 230 associated with the subscription request to the broadcast topic. The subscription module 234 may be configured to subscribe the device 230 to the broadcast topic by obtaining a device identifier and a device registration for the device 230, and add the device identifier, the device registration, and the broadcast topic to the subscription table 224.

As mentioned above, the subscription module 234 may be configured to remove a subscription to a broadcast topic from a subscription table 224. More specifically, device subscriptions to broadcast topics for devices 230 that may no longer be in network connection with a device gateway 214 may be removed subscription tables 224. For example, as part of managing connection states for devices 230, a device gateway 214 may determine that a device 230 is no longer connected to the device gateway 214 and instruct the subscription module 234 to remove subscriptions for the device 230 from a subscription table 224 managed by the subscription module 234. As will be appreciated, other data structures, such as key value data stores, databases, flat files, data objects, and the like may be used to store device subscriptions to broadcast topics.

As illustrated, a device gateway 214 may include a gateway distribution module 236 configured to distribute a publication message received at the device gateway 214 and published to a broadcast topic received to other device gateways 212 in the service provider environment 202. In one example, in response to receiving a publication message at a device gateway 214 (e.g., from a device 230 connected to the device gateway 214, or from a service or application 222) the gateway distribution module 236 may replicate the publication message and send the publication message to a message queue service 216 for distribution to other device gateways 214 hosted in the service provider environment 202. The message queue service 216 may be a managed distributed service. Publication messages may be stored on multiple servers 204 for redundancy and to ensure availability of the publication messages should an instance of the message queue service 216 fail, and the message queue service 216 may be scalable, allowing worker processes in the message queue service 216 to be added or removed according to demand. The message queue service 216 may be used to "fanout" a publication message using the publication/subscription message model utilized by the device gateways 214. For example, the gateway distribution module 236 may send a publication message received at the device gateway 214 to the message queue service 216 where the publication message may be placed in a queue and the message queue service 216 may replicate the publication message and distribute the publication message to the device gateways 214. In one example, the message queue service 216 may push the publication message to the device gateways 214.

In another example, in response to receiving a publication message at a device gateway 214, the gateway distribution module 236 may replicate the publication message and send the publication message to a serverless computing service 218 hosted on a server 206. The serverless computing service 218 may be configured to launch an instance of a compute service program code. The compute service program code may be used to distribute the publication message to the device gateways 214 hosted in the service provider environment 202. For example, the compute service program code may be configured to obtain network addresses for the device gateways 214, replicate the publication message, and push the publication message to the device gateways 214. Illustratively, an instance of a compute service code executed using a serverless computing service 218 may include a segment of program code that may be like a function, and the program code may receive parameters, perform processing, and provide return values. In one aspect, the serverless computing service 218 may be a platform for back-end web services that executes a defined compute service program code on a computing instance hosted in a service provider environment as described in relation to FIG. 8. That is, the compute service program code may execute on a computing instance or in software container (e.g., an isolated environment containing dependencies for executing the compute service program code) that executes code in response to requests to run the compute service program code (e.g., a request from the gateway distribution module 236), and automatically manage compute resources used by compute service program code. Once an instance of compute service program code has been executed and results have been returned, the instance of the compute service program code and results may be removed from computer memory allocated to a computing instance or software container used to execute the compute service program code.

As illustrated, a device gateway 214 may include a device distribution module 238 configured to distribute a publication message to devices 230 connected to the device gateway 214 subscribed to a broadcast topic to which the publication message was published. The publication message may be distributed to the devices 230 by referencing the subscription table 224 stored in computer memory 232 for the device gateway 214 to identify which devices 230 connected to the device gateway 214 are subscribed to the broadcast topic. For example, the device distribution module 238 may be configured to analyze the publication message (e.g., a message header) to determine a device registration and a broadcast topic associated with the publication message. The subscription table 224 may then be queried to obtain device identifiers linked to the device registration and the broadcast topic in the subscription table 224. Thereafter, the publication message may be distributed to the devices 230 associated with the device identifiers obtained from the subscription table 224.

In one example, distributing the publication message to the devices 230 may comprise assigning a portion of a thread pool for the device gateway 214 to send the publication message to the devices 230. For example, a device gateway 214 may have a fixed number of threads in a thread pool used to execute device gateway functions, such as interfacing with devices 230 connected to the device gateway 214, as well as with services and applications 222 in the service provider environment 202. Accordingly, a portion of the thread pool may be available to distribute publication messages to devices 230 subscribed to a broadcast topic, which may include thousands, hundreds of thousands, or even millions of devices 230 connected to the device gateway 214, while a remaining portion of the thread pool may be reserved for other device gateway functions. The device distribution module 238 may be configured to determine a number of threads in a thread pool that can be used to distribute a publication message to connected devices 230 without detrimentally affecting other operations of the device gateway 214. For example, the device distribution module 238 may be configured to determine an available portion of the thread pool based on a current workload of the device gateway 214, a number of devices 230 connected to a device gateway 214, and/or a number of publication messages to be distributed to connected devices 230*a-b*.

The gateway distribution module 236 may work in parallel with the device distribution module 238 to distribute a publication message received at a first device gateway 214 to other device gateways 214 in the service provider environment 202, while distributing the publication message to devices 230 connected to the first device gateway 214. For example, in response to receiving a publication message published to a broadcast topic at the first device gateway 214, the gateway distribution module 236 may be used to distribute the publication message to other device gateways 214 (e.g., via the message queue service 216, the serverless computing service 218, a peer to peer method, or another method). In a similar time frame, the device distribution module 238 may be used to distribute the publication message to devices 230 connected to the first device gateway 214 that are subscribed to the broadcast topic. After receiving the publication message, the other device gateways 214 then distribute the publication message to the devices 230 connected to the other device gateways 214 which are subscribed to the broadcast topic.

In one example, as part of receiving a publication message for distribution to subscribed devices 230, a device gateway 214 may be configured to perform actions linked to rules associated with the publication message. For example, in response to receiving a publication message published to a broadcast topic, rules linked to a device registration and/or a broadcast topic may be obtained from an account policy 220. Rules included in the account policy 220 may be analyzed and actions linked to the rules may be performed based on the publication message. As a non-limiting example, a rule associated with a publication message published to a broadcast topic may be analyzed to determine whether the publication message indicates a security event linked to an action that logs the security event to a security log managed by an application in the service provider environment 202. Other example actions that may be linked to rules may include: augmenting or filtering data received in a publication message from a device, writing data received from a device to a data store, sending a push notification to a customer, device 230, service, or application, generating metrics, as well as other actions. A customer of a service provider may create an account policy 220 and define rules that are linked to actions.

The various processes and/or other functionality included in the system 200 may be executed on one or more processors that are in communication with one or more memory modules. The system 200 may include a number of servers that are arranged, for example, in one or more server banks or computer banks or other arrangements. The servers may support the service provider environment 202 using hypervisors, virtual machine monitors (VMMs) and other virtualization software as described later in association with FIG. 8. For example, a server 212 may host multiple computing instances using a hypervisor, where each computing instance host is used to host a device gateway 214.

Account policies, as well as other data used in the system 200 may be stored on servers 208. The servers may host data storage services that manage data stores. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 202 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

One or more networks 226 connecting devices 230 to device gateways 214, and networks used for communications between components the system 200 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
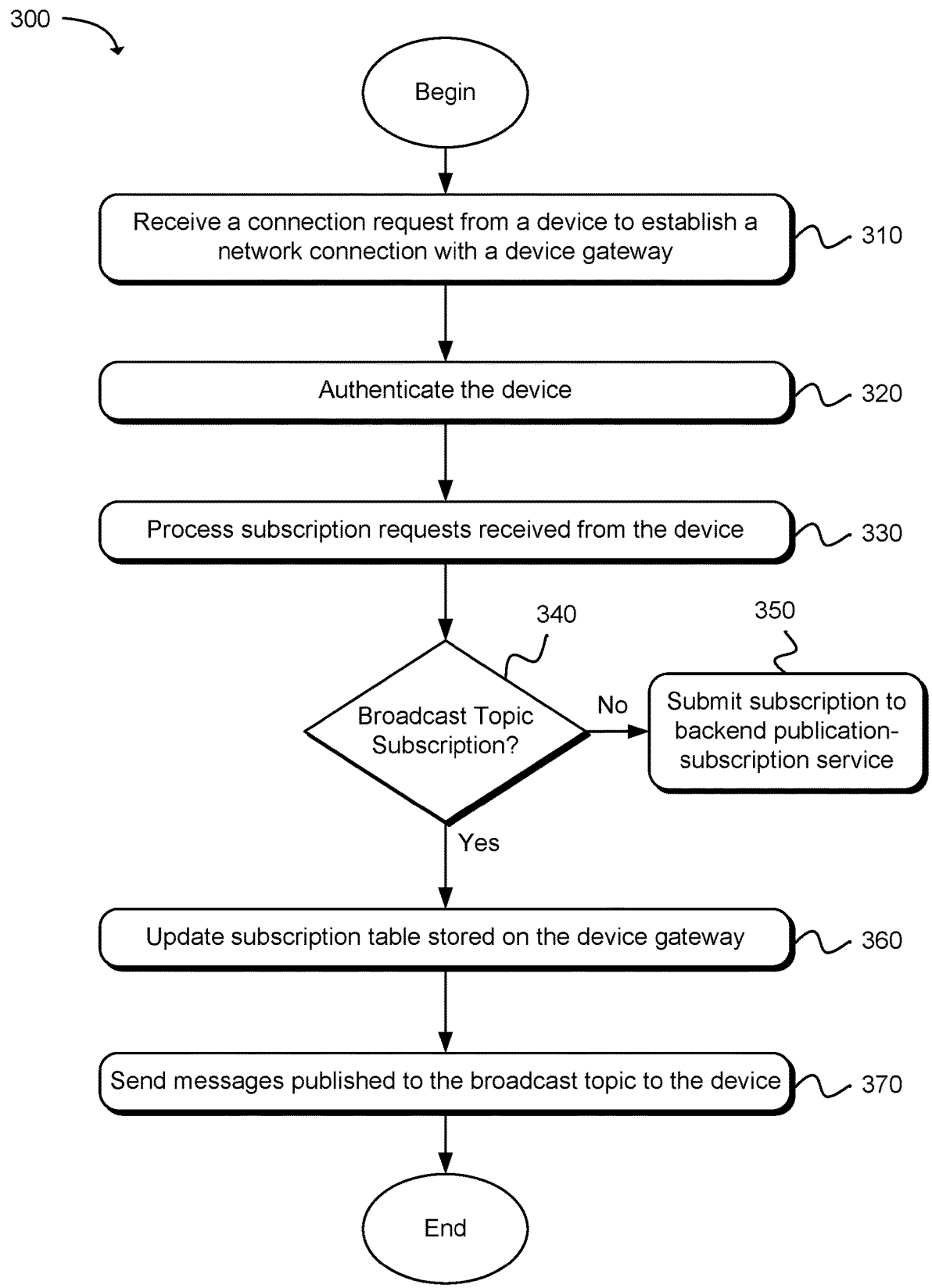
FIG. 3 is a flow diagram illustrating an example method for subscribing to a broadcast topic.

FIG. 3 is a flow diagram illustrating an example method 300 for subscribing to a broadcast topic. As in block 310, a connection request may be received at a device gateway used to provide devices access to managed services and/or applications hosted in a service provider environment. The connection request may be from a device that wants to establish a network connection with the device gateway. Illustratively, establishing a network connection with a device gateway may include registering the device with the device gateway, such that communications sent by the device may be routed via the device gateway.

In response to receiving the connection request from the device, as in block 320, the device may be authenticated. In one example, the device may provide device credentials (e.g., a certificate, token, username-password, signature, device policies, etc.) that may be used to authenticate the device, allowing the device to securely connect to the device gateway in order to access services, applications, and/or other devices through the device gateway. The connection request received from the device may include one or more subscription requests to message topics.

As in block 330, the subscription requests received from the device may be processed. More specifically, a subscription request may be evaluated to determine whether the device has permissions to subscribe to a particular message topic, and as in block 340, whether the message topic is a broadcast topic used to distribute a publication message to subscribed devices. Subscriptions to a broadcast topic may be managed by a device gateway using a subscription table stored on the device gateway (e.g., stored on computer memory allocated to the device gateway), whereas subscriptions to other message topics (i.e., non-broadcast topics) may be managed by a backend publication-subscription service that stores subscriptions to message topics in a backend data store. Managing subscriptions to broadcast topics on a device gateway, as opposed to using a backend publication-subscription service, may result in faster distribution of a publication message to subscribed devices because subscription information may be retrieved from a subscription table on the device gateway, as opposed to requesting the subscription information from the backend publication-subscription service.

In determining that a subscription request is for a broadcast topic, then as in block 360, the subscription table stored on the device gateway may be updated to link a device identifier for the device to a device registration associated with the device and to the broadcast topic in the subscription table. For example, a broadcast topic may be associated with a particular device registration owned by a customer of a service provider. The customer may create a device registration and register the customer's devices with the device registration. The customer may then create a broadcast topic and subscribe the customer's devices to the broadcast topic, allowing the devices to publish and receive publication messages from the broadcast topic, as in block 370. In determining that a subscription request is for a message topic other than a broadcast topic, then as in block 350, the subscription request may be forwarded to a backend publication-subscription service, which may be configured to manage device subscriptions to non-broadcast topics using backend computing resources.

Figure 4:
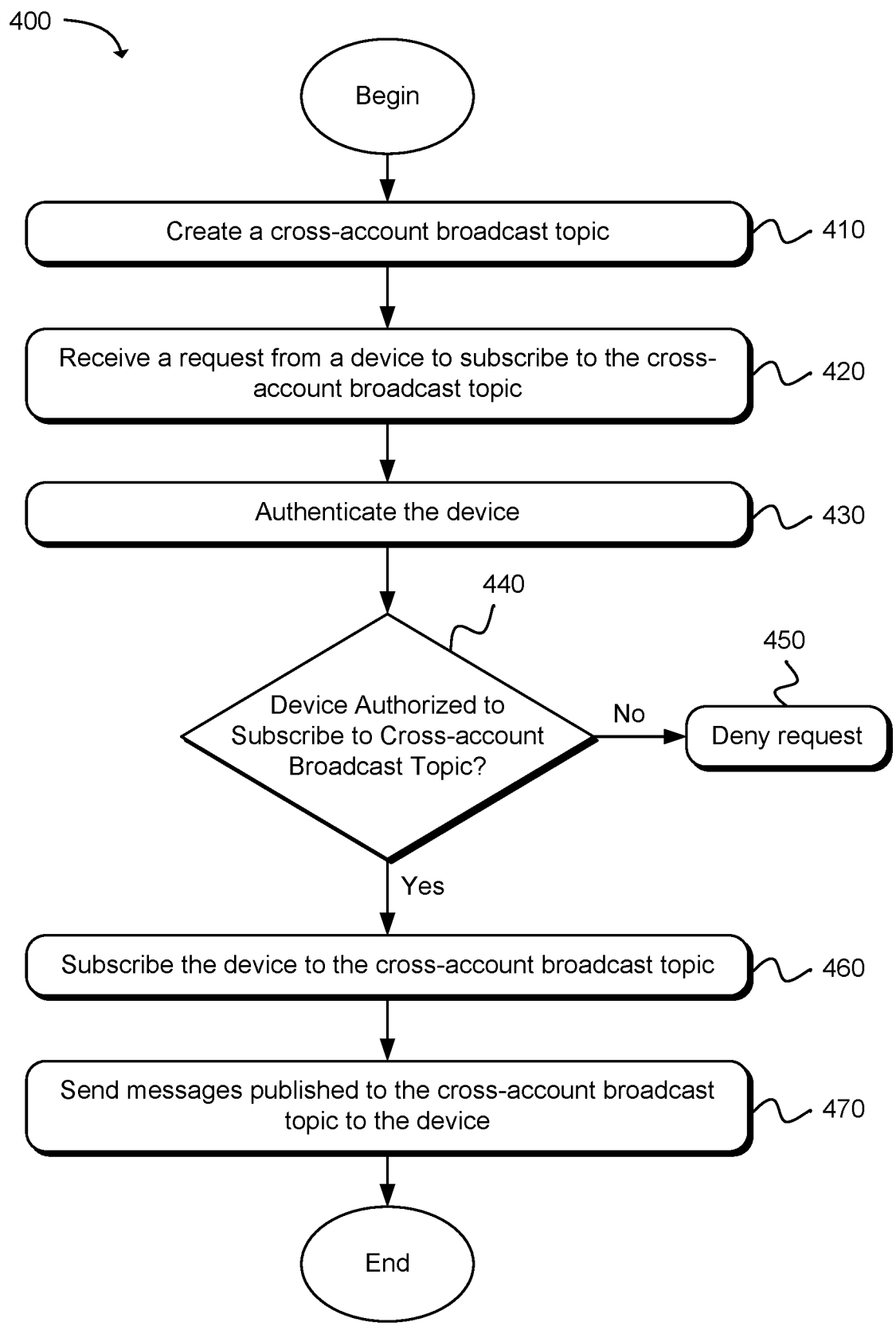
FIG. 4 is a flow diagram illustrating an example method for implementing a cross-account broadcast topic used to distribute messages to devices associated with separate accounts.

FIG. 4 is a flow diagram illustrating an example method 400 for implementing a cross-account broadcast topic used to distribute publication messages to devices associated with different accounts. For example, as described above, a customer of a service provider may create a device registration for the customer's devices and create a broadcast topic linked to the device registration, allowing devices associated with the device registration to subscribe to the broadcast topic. The present technology allows a customer to create a cross-account broadcast topic and specify customer accounts that are allowed to subscribe to the cross-account broadcast topic, as described below.

As in block 410, a customer may create a cross-account broadcast topic that enables devices associated with different accounts to subscribe to the cross-account broadcast topic and receive publication messages published to the cross-account broadcast topic. For example, a customer may create the cross-account broadcast topic using the customer's account (first customer account) and specify a second customer account authorized to subscribe to the cross-account broadcast topic. As will be appreciated, additional customer accounts may be specified and authorized to subscribe to the cross-account broadcast topic. In one example, an identity and access management service may be used to create a cross-account topic that specifies which accounts may have access to a cross-account broadcast topic. Illustratively, a namespace may be used to designate the cross-account broadcast topic (e.g., $crossaccount/myaccountID/$broadcastTopic). In addition to creating the cross-account broadcast topic, the customer may create rules for the cross-account broadcast topic that, for example, may be linked to an action that may be performed based on a publication message and/or a device registration associated with the publication message received by the cross-account broadcast topic. For example, a rule may be linked to an action that logs a device registration associated a publication message published to the cross-account broadcast topic to a log file or an action that sends a push notification indicating a device registration that published a publication message to the cross-account broadcast topic.

After creating the cross-account broadcast topic, as in block 420, a device associated with a second customer account may request to subscribe to the cross-account broadcast topic. The device may be authenticated, as in block 430, using device credentials provided by the device, and as in block 440, a determination may be made whether the device is authorized to subscribe to the cross-account broadcast topic. More specifically, a determination may be made whether the second customer account associated with the device is authorized to subscribe to the cross-account broadcast topic. In one example, an identity and access management service may be queried to determine whether a cross-account associated with the first customer account grants permission to the second account to subscribe to the cross-account broadcast topic.

As in block 450, a determination that the device is associated with an unauthorized customer account results in denying the request. However, as in block 460, a determination that the device is associated with an authorized customer account (e.g., the second customer account described above) results in subscribing the device to the cross-account broadcast topic. For example, a subscription table may be updated to add the device to the cross-account broadcast topic. More specifically, a device identifier for the device may be linked to the first customer account used to create the cross-account broadcast topic, as well as linked to the cross-account broadcast topic in the subscription table. Thereafter, as in block 470, publication messages published to the cross-account broadcast topic may be sent to the device associated with the second customer account. For example, in response to receiving a publication message published to the cross-account broadcast topic, a device gateway may query the subscription table for device identifiers linked to the cross-account broadcast topic. Because the device identifier associated with the second customer account is linked to the cross-account broadcast topic in the subscription table, the device may receive the publication message published to the cross-account broadcast topic.

Figure 5:
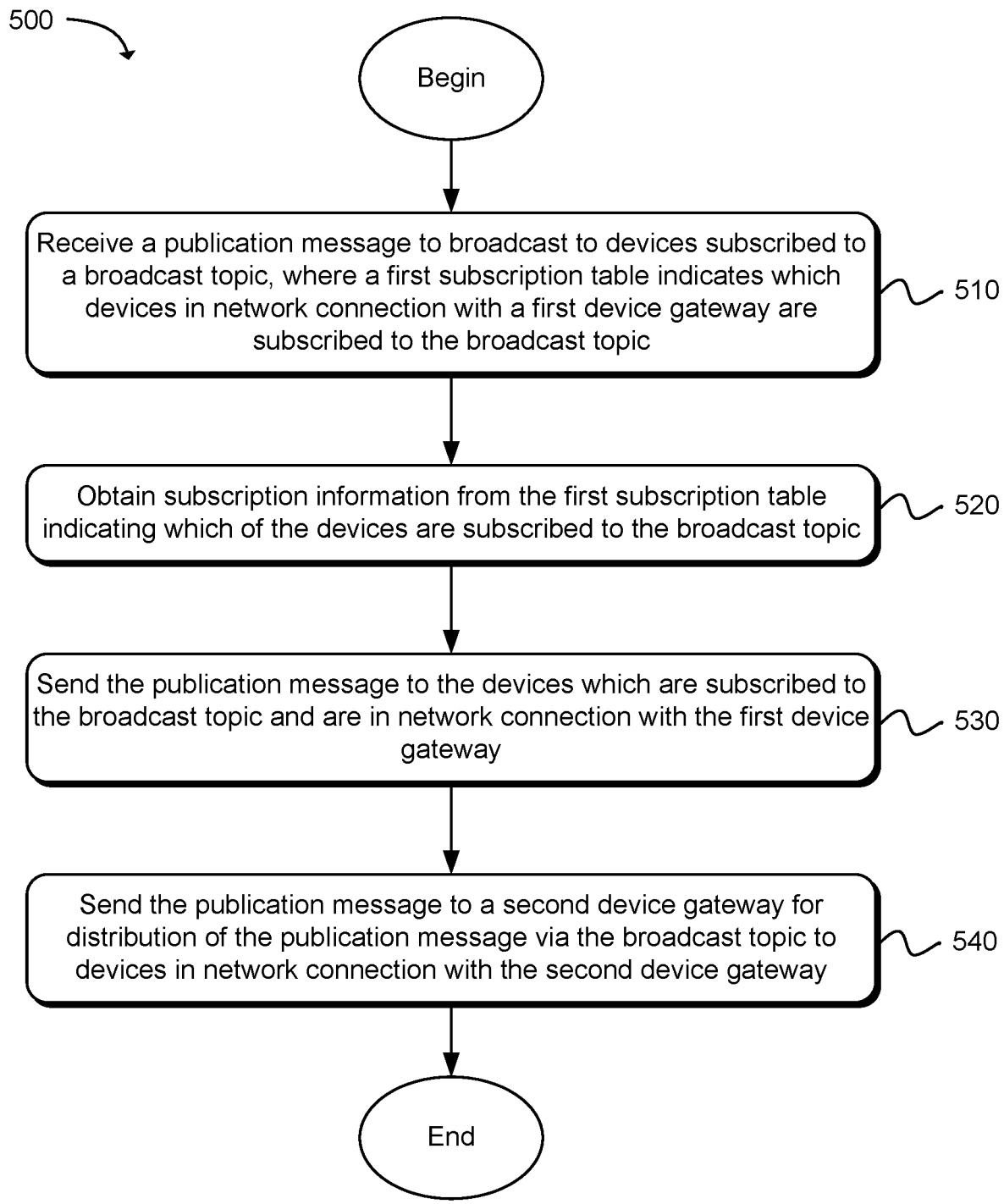
FIG. 5 is a flow diagram that illustrates an example method for broadcasting a message to devices subscribed to a broadcast topic.

FIG. 5 is a flow diagram that illustrates an example method 500 for broadcasting a message to devices subscribed to a broadcast topic. As in block 510, a publication message to broadcast to devices subscribed to a broadcast topic may be received. A first device gateway may maintain a first subscription table for the first device gateway indicating which of the devices in network connection with the first device gateway are subscribed to the broadcast topic. In one example, the publication message may be received from a device in network connection with the first device gateway, or from a service or application hosted in a service provider environment.

In response to receiving the publication message, the publication message may be analyzed to determine that the publication message is published to a broadcast topic, causing the publication message to be distributed to the second device gateway. More specifically, in determining that the publication message is published to a broadcast topic, as in block 520, subscription information may be obtained from the first subscription table indicating which of the devices are subscribed to the broadcast topic. For example, the subscription information may be used to identify which of the devices in network connection with the first device gateway are subscribed to the broadcast topic. As in block 530, the publication message may be sent to the devices subscribed to the broadcast topic and are in network connection with the first device gateway.

As in block 540, the publication message may be sent to a second device gateway for distribution of the publication message via the broadcast topic to devices in network connection with the second device gateway. For example, the second device gateway may maintain a second subscription table for the second device gateway indicating which of the devices in network connection with the second device gateway are subscribed to the broadcast topic. In one example, the publication message may be sent to a message queue service that distributes the publication message to the second device gateway. In another example, a compute service program code may be launched, which distributes the publication message to the second device gateway. The second device gateway may then distribute the publication message to the devices in network connection with the second device gateway that are subscribed to the broadcast topic as indicated in the second subscription table.

Figure 6:
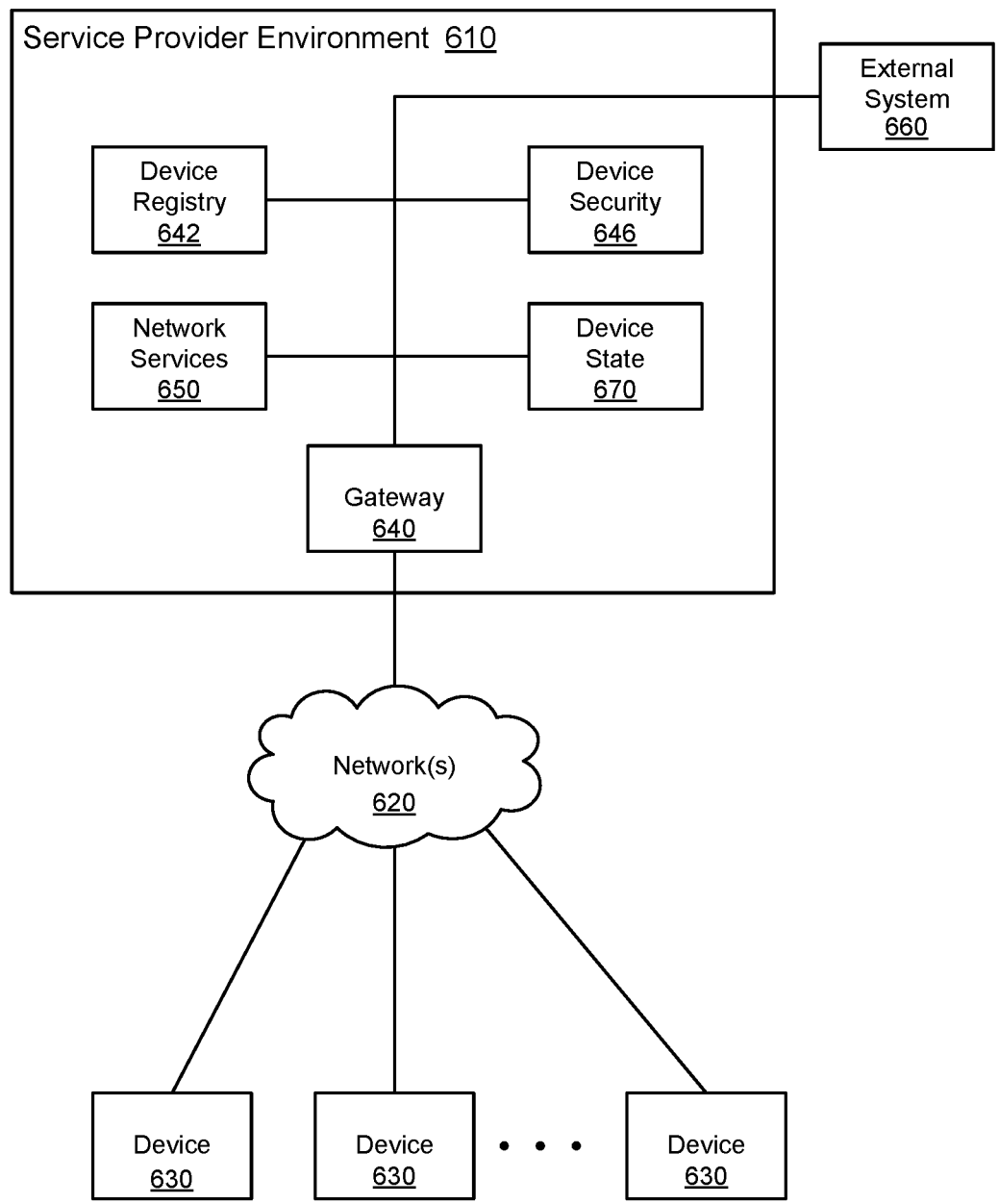
FIG. 6 is a block diagram illustrating an example computer networking architecture for providing device access to network services.

FIG. 6 is a block diagram illustrating an example service provider environment 610 with which the devices 630 described earlier may communicate. The service provider environment 610, which may be referred to as a device communication environment or system that comprises various resources made accessible via a gateway server 640 to the devices 630 that access the gateway server 640 via a network 620. The devices 630 may access the service provider environment 610 in order to access network and device services, such as data storage and computing processing features. Services operating in the service provider environment 610 may communicate data and publication messages to the devices 630 in response to requests from the devices 630 and/or in response to computing operations within the services.

The service provider environment 610 may comprise communicatively coupled component systems 640, 642, 646, 650 and 670 that operate to provide services to the devices 630. The gateway server 640 may be configured to provide an interface between the devices 630 and the service provider environment 610. The gateway server 640 receives requests from the devices 630 and forwards corresponding data and publication messages to the appropriate systems within the service provider environment 610. Likewise, when systems within the service provider environment 610 attempt to communicate data instructions to the devices 630, the gateway server 640 routes those requests to the correct device 630.

The gateway server 640 may be adapted to communicate with varied devices 630 using various different computing and communication capabilities. For example, the gateway server 640 may be adapted to communicate using either TCP (Transmission Control Protocol) or UDP (User Datagram Protocol) protocols. Likewise, the gateway server 640 may be programmed to receive and communicate with the devices 630 using any suitable protocol including, for example, MQTT (Message Queue Telemetry Transport), CoAP (Constrained Application Protocol), HTTP (Hypertext Transfer Protocol), and HTTPS (HTTP secure). The gateway server 640 may be programmed to convert the data and instructions or publication messages received from the devices 630 into a format that may be used by other server systems comprised in the service provider environment 610. In one example, the gateway server 640 may be adapted to convert a publication message received using the HTTPS protocol into a JSON formatted publication message that is suitable for communication to other servers within the service provider environment 610.

The gateway server 640 may store, or may control the storing, of information regarding the devices 630 that have formed a connection to the particular gateway server 640 and for which the particular gateway server 640 may be generally relied upon for communications with the device 630. In one example, the gateway server 640 may have stored thereon information specifying the particular device 630 such as a device identifier. For each connection established from the particular device 630, the gateway server 640 may also maintain information identifying the connection. For example, a connection identifier may be generated and stored for each connection established with a particular device 630. Information relating to the particular connection may also be stored. For example, information identifying the particular socket of the gateway server 640 on which the connection was established, as well as information identifying the particular protocol used by the device 630 on the connection may be stored by the gateway server 640. Information such as the socket and protocol may be used in order to facilitate further communications via the particular connection.

In one example, the gateway server 640 may communicate via any suitable networking technology with a device registry server 642. The device registry server 642 may be adapted to track the attributes and capabilities of each device 630. In an example, the device registry sever 642 may be provisioned with information specifying the attributes of the devices 630. The device registry server 642 may comprise data specifying rules or logic (e.g., automation rules) for handling various requests that may be received from the devices 630. The device registry server 642 may be programmed to convert specialized device functions or commands received in particular communication protocols such as, for example HTTPS, MQTT, CoAP, into functions or commands using particular protocols that are understood by other of the servers in the service provider environment 610. In one example, the device registry server 642 may be provisioned with information specifying that upon receipt of a particular request from a particular device 630, a request should be made to store the payload data of the request in a particular network service server 650. The device registry server 642 may be similarly programmed to receive requests from servers 642, 650 and convert those requests into commands and protocols understood by the devices 630.

The device state server 670 maintains state information for each connected device 630. In an example embodiment, the device state server 670 maintains for each device 630 that has connected to the service provider environment 610 information specifying a plurality of states. In an example scenario, the device state server 670 may comprise a recorded state and a desired state. The recorded state represents the existing state of the particular device 630 as presently known to the device state server 670. The device state server 670 may be configured to manage groups of device representations and manage communications associated with group commands as described earlier. The device state server 670 communicates with the device gateway 640 in order to communicate requests to update a status to a particular device 630. For example, the device state sever 670 may communicate to the device gateway 640 a sequence of state transition commands that update the status of a device 630. The device gateway 640 may, in response, communicate the appropriate commands formatted for the particular device.

The device security server 646 maintains security-related information for the devices 630 that connect to the service provider environment 610. In one example, the device security server 646 may be programmed to process requests to register devices 630 with the service provider environment 610. For example, entities such as device manufacturers, may forward requests to register devices 630 with the service provider environment 610. The device security server 646 receives registration requests and assigns unique device identifiers to devices 630 which use the device identifiers on subsequent requests to access the service provider environment 610. The device security server 646 stores, for each registered device, authentication information that may be provided during the device registration process. For example, a request to register a device 630 may comprise information identifying the device 630 such as a device serial number and information for use in authenticating the device 630. In one example, the information may comprise a digital certificate and may comprise a public key of a public key-private key pair. The information may be stored in relation to the assigned device identifier for the particular device 630. When the device 630 subsequently attempts to access the service provider environment 610, the request may be routed to the device security server 646 for evaluation. The device security server 646 determines whether authentication information provided in the request is consistent with the authentication information stored in relation to the device identifier and provided during the registration process.

The device security server 646 may be further programmed to process request to associate particular entities (individuals or organizations) with particular devices 630. The device security server 646 may be adapted to receive requests to register entities, which may be, for example, individuals, users, accounts, and/or organizations, as authorized to control or communicate with a particular device 630. In one example, a request may be received from an individual or organization that may have purchased a device 630 from a manufacturer. For example, the device may be a dishwasher, thermostat, or lighting assembly that an individual or organization purchased from the manufacturer. The individual or organization may initiate a request to register the device 630 with the individual or an organization with which the organization is associated. The request may be routed to a web services server which may be comprised in service provider environment 610 or which communicates the request to the service provider environment 610. The request identifies the device 630 and the particular entity (individual or organization) that is requesting to be associated with the device 630. In one example, the request may comprise a unique device identifier that was assigned when the device 630 was registered with the system. The request further may comprise information uniquely identifying the entity that is registering as having authority to communicate with and/or control the particular device 630.

The device security server 646 stores the information identifying the particular entity in relation with the device identifier. When the particular entity subsequently attempts to control or communicate data to the particular device 630, the device security server 646 may use the information to confirm that the particular entity is authorized to communicate with or control the particular device 630. When an entity that has not been registered as being authorized to communicate with the device 630 attempts to communicate with or control the device 630, the device security server 646 may use the information stored in the device security server 646 to deny the request.

A network services server 650 may be any resource or processing server that may be used by any of servers 640, 642, 646, or 670 in processing requests from the devices 630. In one example, network services server 650 may provide data storage and retrieval services and/or on-demand processing capacity. In an example scenario, the network services server 650 may be any of numerous network accessible services including, for example, web or cloud-based services. In one example, the web services server 650 may be programmed to provide particular processing for particular devices 630 and/or groups of devices 630.

Servers 640, 642, 646, 650, and 670 may be communicatively coupled via any suitable networking hardware and software. For example, the servers may communicate via a local area network or wide area network.

An external system 660 may access service provider environment 610 for any number of purposes. In one example, an external system 660 may be a system adapted to forward requests to register devices 630 with the service provider environment 610. For example, an external system 660 may include a server operated by or for a device manufacturer that sends requests to service provider environment 610, and device security server 646 in particular, to register devices 630 for operation with service provider environment 610. Similarly, the external system 660 may be a system operated to provide a gateway for entities (individuals or organizations) to register an ownership or control relationship with a particular device 630.

The devices 630 may be any devices that may be communicatively coupled via a network 620 with the service provider environment 610. For example, the devices 630 may be computing devices such as smart phones and tablet computers, automobiles, appliances such as washers and driers, industrial sensors, switches, control systems, etc. In one example, each of devices 630 may communicate over the network 620 to store data reflecting the operations of the particular device 630 and/or to request processing provided by, for example, network services server 650. While FIG. 3 depicts three devices 630, it will be appreciated that any number of devices 630 may access the service provider environment 610 via the gateway server 640. Further it will be appreciated that the devices 630 may employ various different communication protocols. For example, some devices 630 may transport data using TCP, while others may communicate data using UDP. Some devices 630 may use MQTT, while others may use CoAP, and still others may use HTTPs. It will also be appreciated that each of devices 630 may be programmed to send and receive particular functions or commands in its requests that are not compatible with other devices or even the systems within service provider environment 610. The gateway server 640 may be programmed to receive and, if needed, attend to converting such requests for processing with the service provider environment 610.

Figure 7:
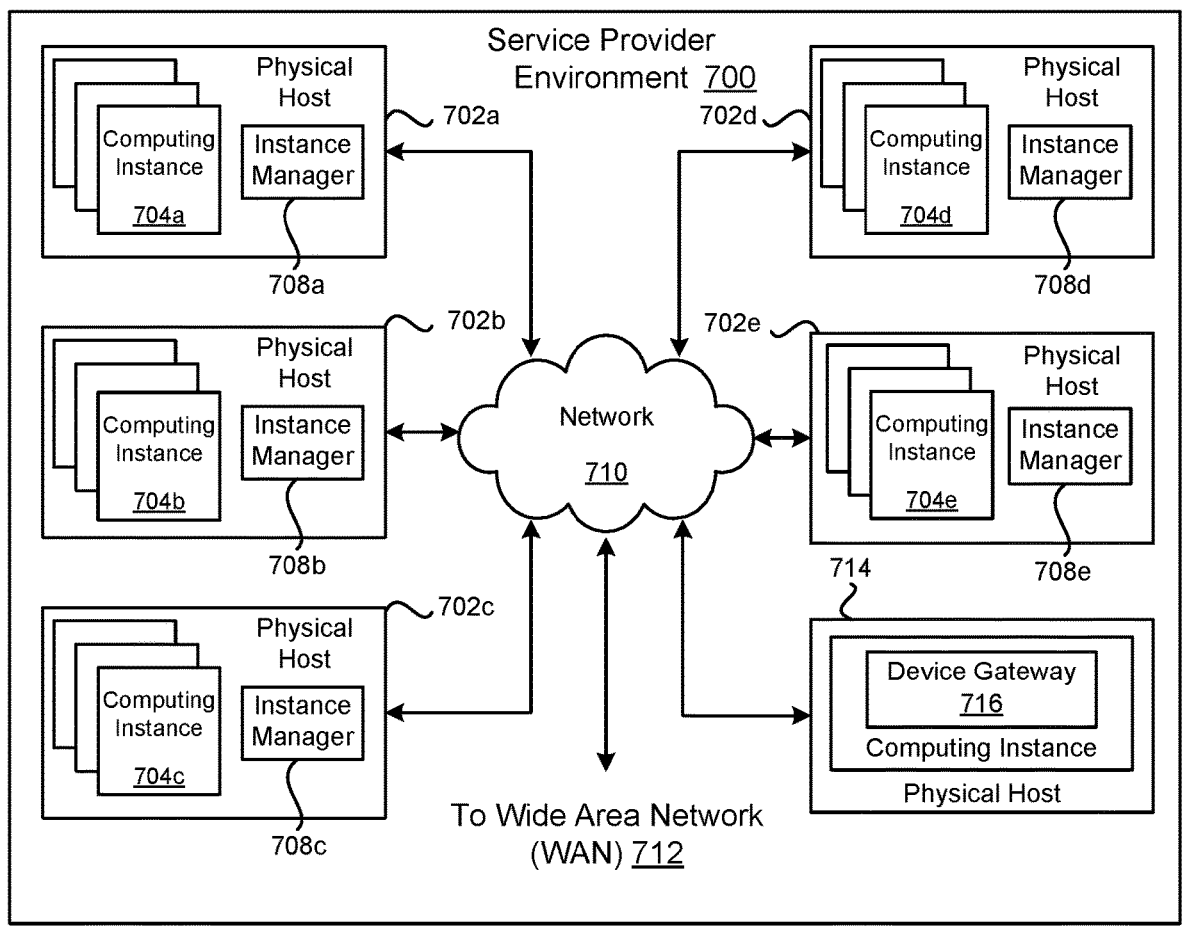
FIG. 7 is a block diagram that illustrates an example service provider environment that includes a device gateway.

FIG. 7 is a block diagram illustrating an example service provider environment 700 that may be used to execute and manage a number of computing instances 704*a-e*. In particular, the service provider environment 700 depicted illustrates one environment in which the technology described herein may be used. The service provider environment 700 may be one type of environment that includes various virtualized service resources that may be used, for instance, to host computing instances 704*a-e*.

The service provider environment 700 may be capable of delivery of computing, storage and networking capacity as a software service to a community of end recipients. In one example, the service provider environment 700 may be established for an organization by or on behalf of the organization. That is, the service provider environment 700 may offer a "private cloud environment." In another example, the service provider environment 700 may support a multi-tenant environment, wherein a plurality of customers may operate independently (i.e., a public cloud environment). Generally speaking, the service provider environment 700 may provide the following models: Infrastructure as a Service ("IaaS"), Platform as a Service ("PaaS"), and/or Software as a Service ("SaaS"). Other models may be provided. For the IaaS model, the service provider environment 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a computing service platform provided by the service provider environment 700 without incurring the cost of buying and managing the underlying hardware and software. The SaaS model allows installation and operation of application software in the service provider environment 700. End customers may access the service provider environment 700 using networked client devices, such as desktop computers, laptops, tablets, smartphones, etc. running web browsers or other lightweight client applications, for example. Those familiar with the art will recognize that the service provider environment 700 may be described as a "cloud" environment.

The particularly illustrated service provider environment 700 may include a plurality of physical hosts 702*a-e*. While six physical hosts are shown, any number may be used, and large data centers may include thousands of physical hosts. The service provider environment 700 may provide computing resources for executing computing instances 704*a-e*. Computing instances 704*a-e* may, for example, be virtual machines. A virtual machine may be an instance of a software implementation of a machine (i.e. a computer) that executes applications like a physical machine. In the example of a virtual machine, each of the physical hosts 702*a-e* may be configured to execute an instance manager 708*a-e* capable of executing the instances. The instance manager 708*a-e* may be a hypervisor, virtual machine monitor (VMM), or another type of program configured to enable the execution of multiple computing instances 704*a-e* on a single physical host. Additionally, each of the computing instances 704*a-e* may be configured to execute one or more applications.

A physical host 714 may execute a device gateway 716 configured to distribute a publication message published to a broadcast topic as described earlier. In one example, device gateways 716 may be hosted by one or more computing instances 704*a-e*. A network 710 may be utilized to interconnect the service provider environment 700 and the physical hosts 702*a-e*, 714. The network 710 may be a local area network (LAN) and may be connected to a Wide Area Network (WAN) 712 or the Internet, so that end customers may access the service provider environment 700. The network topology illustrated in FIG. 7 has been simplified, many more networks and networking devices may be utilized to interconnect the various computing systems disclosed herein.

Figure 8:
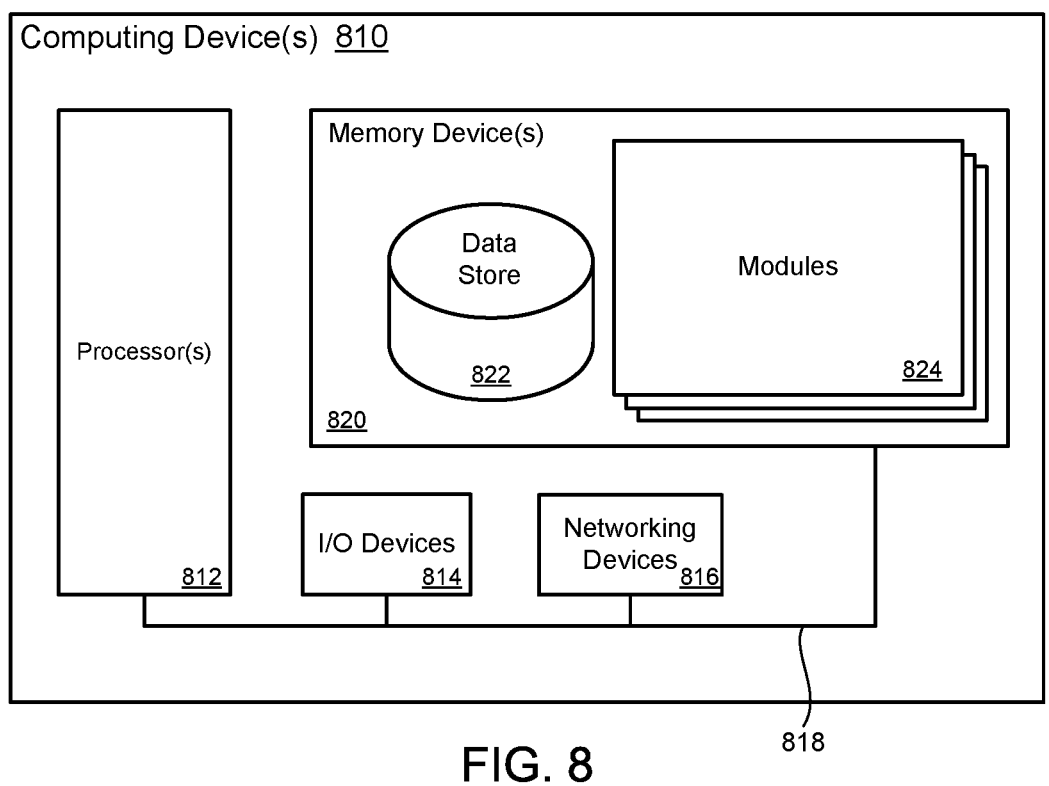
FIG. 8 is a block diagram illustrating an example of a computing device that may be used to execute a method to broadcast a publication message to devices subscribed to a broadcast topic.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. For example, the memory device 820 may include subscription module, a gateway distribution module, a device distribution module, and other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor;
   a memory device including instructions that, when executed by the at least one processor, cause the system to:
   receive, at a first device gateway, a publication message from a device, wherein the first device gateway is one of a plurality of device gateways that (1) act as gateways to a service provider environment and (2) broadcast publication messages to devices subscribed to a broadcast topic using subscription tables maintained by the plurality of device gateways and (3) forward messages published to non-broadcast topics to a centralized publication-subscription service located in the service provider environment;
   determine, at the first device gateway, that the publication message is for broadcast to other devices subscribed to the broadcast topic;
   obtain from a first subscription table a device listing of the devices which are in network connection with the first device gateway and are subscribed to the broadcast topic;
   send the publication message to the devices indicated in the device listing; and
   send the publication message to a second device gateway, which is included in the plurality of device gateways, that maintains a second subscription table indicating which of the devices in network connection with the second device gateway are subscribed to receive the publication message via the broadcast topic.

2. The system as in claim 1, further comprising a memory device including instructions that, when executed by the processor, cause the system to:
   receive a device request to establish a network connection with the first device gateway that includes instructions to subscribe the device to the broadcast topic; and
   subscribe the device to the broadcast topic by linking a device identifier to a device registration and the broadcast topic in the first subscription table.

3. The system as in claim 1, wherein the first subscription table is stored in a computer memory of the first device gateway, and the first subscription table links a device registration to the broadcast topic.

4. The system as in claim 1, wherein a MQTT (Message Queue Telemetry Transport) protocol is used to send and receive the publication message.

5. A computer implemented method, comprising:
   receiving, at a first device gateway, a publication message, wherein the first device gateway is one of a plurality of device gateways which act as gateways to a service provider environment and broadcast publication messages to devices subscribed to a broadcast topic using subscription tables and forward messages published to non-broadcast topics to a centralized publication-subscription service located in the service provider environment;
   determining, at the first device gateway, that the publication message is for broadcast to the devices subscribed to the broadcast topic;
   obtaining subscription information from a first subscription table indicating the devices subscribed to the broadcast topic;
   sending the publication message to the devices which are subscribed to the broadcast topic and are in network connection with the first device gateway; and
   sending the publication message to a second device gateway to be broadcast to the devices connected to the second device gateway, which are subscribed to the broadcast topic.

6. The method in claim 5, wherein the first subscription table is located on the first device gateway and a second subscription table is located on the second device gateway.

7. The method in claim 5, further comprising analyzing the publication message to determine that the publication message is published to the broadcast topic, which causes the publication message to be sent to the second device gateway.

8. The method in claim 5, wherein the publication message is sent to the second device gateway in parallel to sending the publication message to the devices in network connection with the first device gateway.

9. The method in claim 5, wherein sending the publication message to the second device gateway further comprises sending the publication message to a publication message queue service that sends the publication message to device gateways included in a service provider environment.

10. The method in claim 5, wherein sending the publication message to the second device gateway further comprises launching compute service program code that sends the publication message to device gateways included in a service provider environment.

11. The method in claim 5, wherein sending the publication message to the devices in network connection with the first device gateway further comprises assigning a portion of threads in a thread pool for a device gateway to send the publication message to the devices that are in network connection with the first device gateway and are subscribed to the broadcast topic.

12. The method in claim 5, wherein sending the publication message to the devices in network connection with the first device gateway further comprises determining an amount of network bandwidth to use to send the publication message to the devices that are in network connection with the first device gateway and are subscribed to the broadcast topic.

13. The method in claim 5, wherein sending the publication message to the devices in network connection with the first device gateway further comprises obtaining rules from an account policy used to distribute the publication message to the devices that are in network connection with the device gateway and are subscribed to the broadcast topic.

14. The method in claim 5, further comprising:
receiving device requests to establish network connections with the first device gateway to access managed services and applications hosted in the service provider environment, wherein the device requests include subscriptions to message topics;
identifying a portion of the subscriptions as broadcast subscriptions to the broadcast topic; and
building the first subscription table in computer memory of the first device gateway to include subscription information for the devices subscribed to the broadcast topic.

15. The method in claim 14, further comprising:
determining that the first subscription table exceeds a memory limitation of the computer memory; and
storing a portion of the first subscription table on a local data store for the first device gateway.

16. The method in claim 5, wherein the publication message to broadcast to the devices subscribed to the broadcast topic is received from a device in network connection with the first device gateway, from a service, or from an application hosted in the service provider environment.

17. A non-transitory machine readable storage medium having instructions embodied thereon, the instructions when executed by a processor:
receive, at a first device gateway, a publication message, wherein the first device gateway is one of a plurality of device gateways that act as gateways to a service provider environment, and broadcast publication messages to devices subscribed to a broadcast topic using subscription tables maintained by the plurality of device gateways, and forward messages published to non-broadcast topics to a centralized publication-subscription service located in the service provider environment;
determine, at the first device gateway, that the publication message is to be broadcast to the devices subscribed to the broadcast topic;
identify a subscription table in computer memory for the first device gateway that indicates which of the devices in network connection with the first device gateway are subscribed to the broadcast topic;
query the subscription table to identify the devices subscribed to the broadcast topic in response to receiving the publication message;
send the publication message to the devices, in network connection with the first device gateway, which are identified as being subscribed to the broadcast topic; and
send the publication message to a second device gateway included in the plurality of device gateways to allow the publication message to be distributed to the devices connected to the second device gateway subscribed to the broadcast topic.

18. The non-transitory machine readable storage medium as in claim 17, wherein the instructions that when executed by the processor further receive a request to create a cross-account broadcast topic for a first customer account, wherein the request specifies a second customer account from which devices are authorized to subscribe to the cross-account broadcast topic.

19. The non-transitory machine readable storage medium in claim 18, wherein the instructions that when executed by the processor further:
receive a request from a device associated with the second customer account to subscribe to the cross-account broadcast topic associated with the first customer account;
determine that the second customer account is authorized to subscribe to the cross-account broadcast topic; and
subscribe the device associated with the second customer account to the cross-account broadcast topic.

20. The non-transitory machine readable storage medium in claim 19, wherein the instructions that when executed by the processor further link the device associated with the second customer account with the first customer account and the cross-account broadcast topic in the subscription table.

* * * * *